Oct. 29, 1957 H. HOLZWARTH ET AL 2,811,693

POLARITY-TRUE IMPULSE SCANNING OF OSCILLATIONS

Filed May 20, 1955

Inventors.
Herbert Holzwarth, &
Walter Arens.
By. [signature] Atty.

2,811,693
Patented Oct. 29, 1957

2,811,693

POLARITY-TRUE IMPULSE SCANNING OF OSCILLATIONS

Herbert Holzwarth and Walter Arens, Munich, Germany, assignors to Siemens & Halske Aktiengesellschaft, Munich, Germany, a corporation of Germany Application May 20, 1955, Serial No. 509,952
In Germany October 1, 1948

Public Law 619, August 23, 1954
Patent expires October 1, 1968

6 Claims. (Cl. 332—9)

This invention is concerned with a circuit arrangement for polarity-true impulse scanning of oscillations.

It is in many situations desirable to obtain polarity-true scanning of oscillations produced by a generator, that is, to scan an oscillation symmetrically to the zero voltage. All prior impulse modulation circuits operate, however, with a base bias voltage relative to which the scanned voltage fluctuates. The resulting modulated impulses have accordingly the same polarity exhibiting changes only with respect to their amplitudes which fluctuate relative to a predetermined mean value.

The invention proposes an arrangement for scanning a voltage polarity-true, that is, to produce by scanning modulated impulses which are depending on the magnitude of the scanned voltage respectively positive or negative despite the fact that the impulses used in the scanning have the same polarity.

A further advantage of the invention resides in the possibility of operating with dry rectifiers while tubes are being used in all known impulse modulation circuits. The circuit arrangement according to the invention can consequently be produced with considerably reduced expenditures as compared with known arrangements.

The invention may be realized by placing the voltage which is to be scanned on a central tab of the secondary winding of a repater or transformer to the primary winding of which is fed the scanning impulse voltage, and by connecting between the terminals of the secondary winding two series connected rectifiers between which is obtained the scanned voltage.

Figure 1:
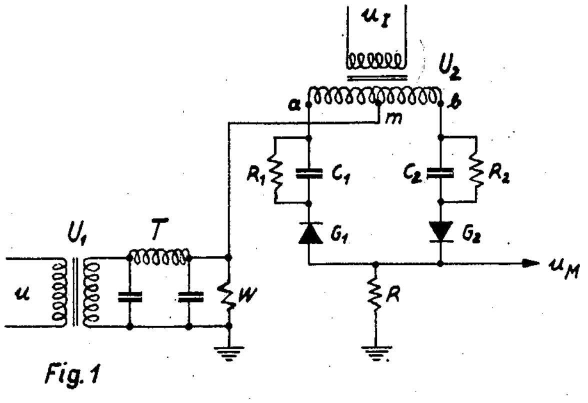
Figure 2:
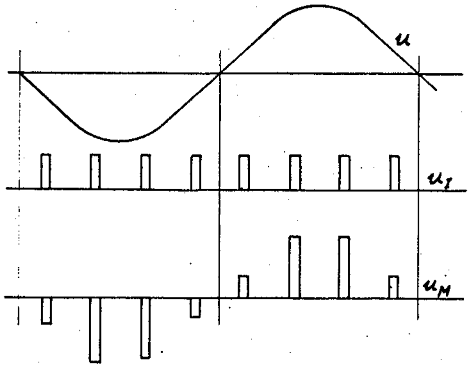
Figure 3:
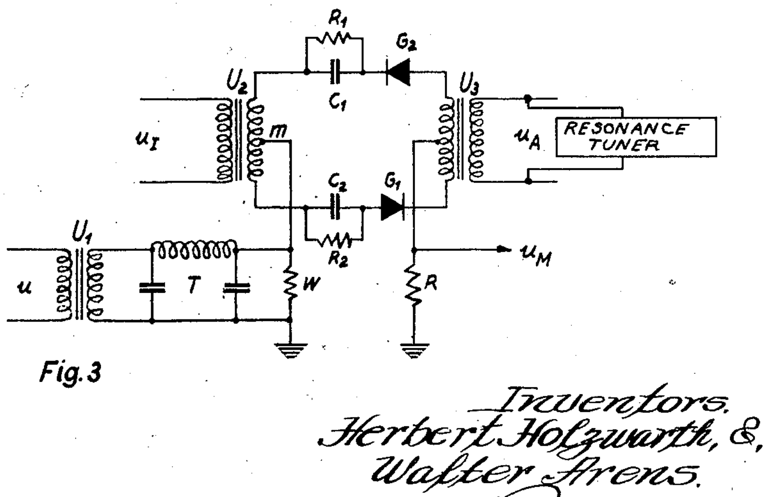

The foregoing and other objects and features of the invention will appear from the following description which will be rendered with reference to the accompanying drawing in which Fig. 1 shows in schematic manner a circuit according to the invention;

Fig. 2 is a diagram showing the effective voltages resulting in the circuit according to Fig. 1; and Fig. 3 shows a modified circuit.

Referring now to Fig. 1, the voltage *u* which is to be scanned is fed to the center tab *m* of the transformer U2 by way of the transformer U1 and the low pass T, the scanning impulse voltage *u*I being fed to the primary winding of the transformer U2. Rectifiers G1 and G2 are respectively connected to the terminals *a* and *b* of the transformer U2 and interconnected over a resistor R, the scanned modulated voltage appearing at this resistor and being obtained at *u*M. The low pass T terminates in a wave resistor W and serves to cut off all frequencies lying above the working band. The capacitors C1 and C2 and the resistors R1 and R2 connected respectively in shunt therewith maintain at the rectifiers G1 and G2 a predetermined blocking voltage which arises automatically due to the impulse current and the magnitude of which may be adjusted by variation of the resistors.

The operation of this circuit arrangement which is believed to be apparent from the showing, is briefly as follows:

The rectifiers G1 and G2 operate in conjunction with the impulse voltage *u*I fed to the transformer U2 in the manner of an inertia-free switch which is open beyond the pass voltage only for the duration of an impulse, that is, during the interval of overcoming the bias voltage of a rectifier. After decay of an impulse, the rectifiers are again blocked and will be opened again only incident to the next successive impulse. The voltage *u* to be scanned which is connected to the center tab *m* appears at the resistor R during the opening intervals of the rectifiers G1 and G2, that is to say, for the duration of an impulse *u*I, with its true magnitude (if the pass resistances are low) and with its true polarity, and may be obtained at *u*M. Low capacity rectifiers of somewhat similar characteristics may be used, for example, germanium rectifiers. Lack of symmetry may however be compensated by connecting resistor means in series with one or the other rectifier.

The topmost line in Fig. 2 indicates a sine wave voltage *u* which is being scanned by the downwardly next successive impulse voltage *u*I. The result is indicated in the bottom line showing the modulated impulse voltage *u*M which reflects the sine voltage *u* in amplitude-true and polarity-true manner.

For the systems which have lately become known, for simultaneously transmitting a plurality of messages by means of alternating modulated impulses, there are as many modulator circuits required as there are messages to be transmitted. The scanning impulses must thereby exhibit a mutual displacement as to time as is required for the alternating message succession in the transmitter line. Systems have been proposed in which a predetermined number of impulses is selected and conducted to a modulator, by means of mutually phase-shifted oscillations, for example, sine oscillations, while the remaining impulses are barred from such modulator and distributed similarly to other modulators by other mutually phase-shifted oscillations.

An embodiment of the invention making such operation possible is indicated in Fig. 3.

In Fig. 3, reference U1 designates again the transformer over which is conducted the voltage *u* which is to be scanned; T is the low pass which terminates in the resistor W; and U2 is the transformer to the primary winding of which is fed the impulse voltage *u*I and to the center tab *m* of which is conducted the voltage *u* coming from the low pass T. The two rectifiers are shown at G1 and G2; C1/R1—C2/R2 are the capacitor-resistor means and R is the resistor at which appears the modulated voltage *u*M. The various parts noted above correspond to similarly referenced parts in Fig. 1.

There is however provided a transformer U3 the primary winding of which is connected to the rectifiers and such winding is accordingly traversed by a sine wave voltage *u*A. The blocking voltage of the rectifiers G1 and G2 and the capacitors C1 and C2 with their respectively associated parallel-connected resistors R1 and R2 are so dimensioned that only those impulses from the impulse voltage *u*I which appear at the peak voltage of the oscillation *u*A will cause opening of the rectifiers. All other impulses do not produce with their respective lower momentary values of the oscillation *u*A the lowest voltage required for the opening of the rectifiers.

Therefore, if the frequency of the oscillation *u*A is for example one-eighth of the impulse frequency *u*I, only each eighth impulse will cause opening of the rectifiers G1 and G2. The remaining intermediately positioned impulses may accordingly be used in similarly constructed circuits for the scanning of other voltages.

The resistor R may be common to all circuits employing arrangements according to the invention which are in cooperative operation for the purpose of carrying out alternating scanning of different voltages and all the modulated voltages will accordingly appear at such resistor.

The arrangement shown in Fig. 3 requires rectifiers having relatively high blocking voltages because they are opened by two superimposed voltages of the oscillations *u*A and the impulse voltage *u*I. The capacitors and resistors must likewise be dimensioned differently from those used in Fig. 1, because the automatically generated mean bias voltage for the rectifiers must be dimensioned not only for the impulse voltage *u*I but for the superposed voltages *u*I and *u*A. The transformer or repeater U3 may be constructed as a resonance repeater and may be tuned to the frequency of the oscillation *u*A by known and suitable means.

Changes may be made within the scope and spirit of the appended claims.

We claim:

1. Circuit arrangement for polarity-true scanning of voltages by means of impulses comprising a transformer, means for conducting the scanning impulse voltage to the primary winding of said transformer, means for conducting the voltage to be scanned to the secondary winding of said transformer centrally thereof, a pair of rectifiers, parallel resistance-capacitor circuits connecting a pair of unlike poles of said rectifiers to the end terminals of said secondary winding, and means for taking off the scanned voltage at a common junction of a second pair of unlike poles of said serially connected rectifiers.

2. A circuit arrangement according to claim 1, comprising a low pass filter terminating in a wave resistor, and means for conducting the voltage to be scanned over said low pass filter to said secondary winding.

3. A circuit arrangement according to claim 2, comprising a further transformer, means for connecting the secondary winding of said further transformer in circuit with said rectifiers, said scanned voltage being taken off at such secondary winding, and means for connecting to the primary winding of said further transformer an alternating current having a frequency which is lower than that of the scanning impulses.

4. A circuit arrangement according to claim 3, wherein said further transformer is tuned to the frequency of the alternating current conducted to its primary winding.

5. A circuit arrangement according to claim 1, comprising a further transformer, means for connecting the secondary winding of said further transformer in circuit with said rectifiers, said scanned voltage being taken off at such secondary winding, and means for connecting to the primary winding of said further transformer an alternating current having a frequency which is lower than that of the scanning impulses.

6. A circuit arrangement according to claim 5, wherein said further transformer is tuned to the frequency of the alternating current conducted to its primary winding.

References Cited in the file of this patent

UNITED STATES PATENTS

| | | |
|---|---|---|
| 2,086,601 | Caruthers | July 13, 1937 |
| 2,244,799 | Paddle | June 10, 1941 |
| 2,492,863 | Hays | Dec. 27, 1949 |
| 2,518,013 | Houghton | Aug. 8, 1950 |